May 13, 1969     R. M. VOITIK ET AL     3,443,815
PRESSURE RELIEVED LABYRINTH
Filed July 14, 1966
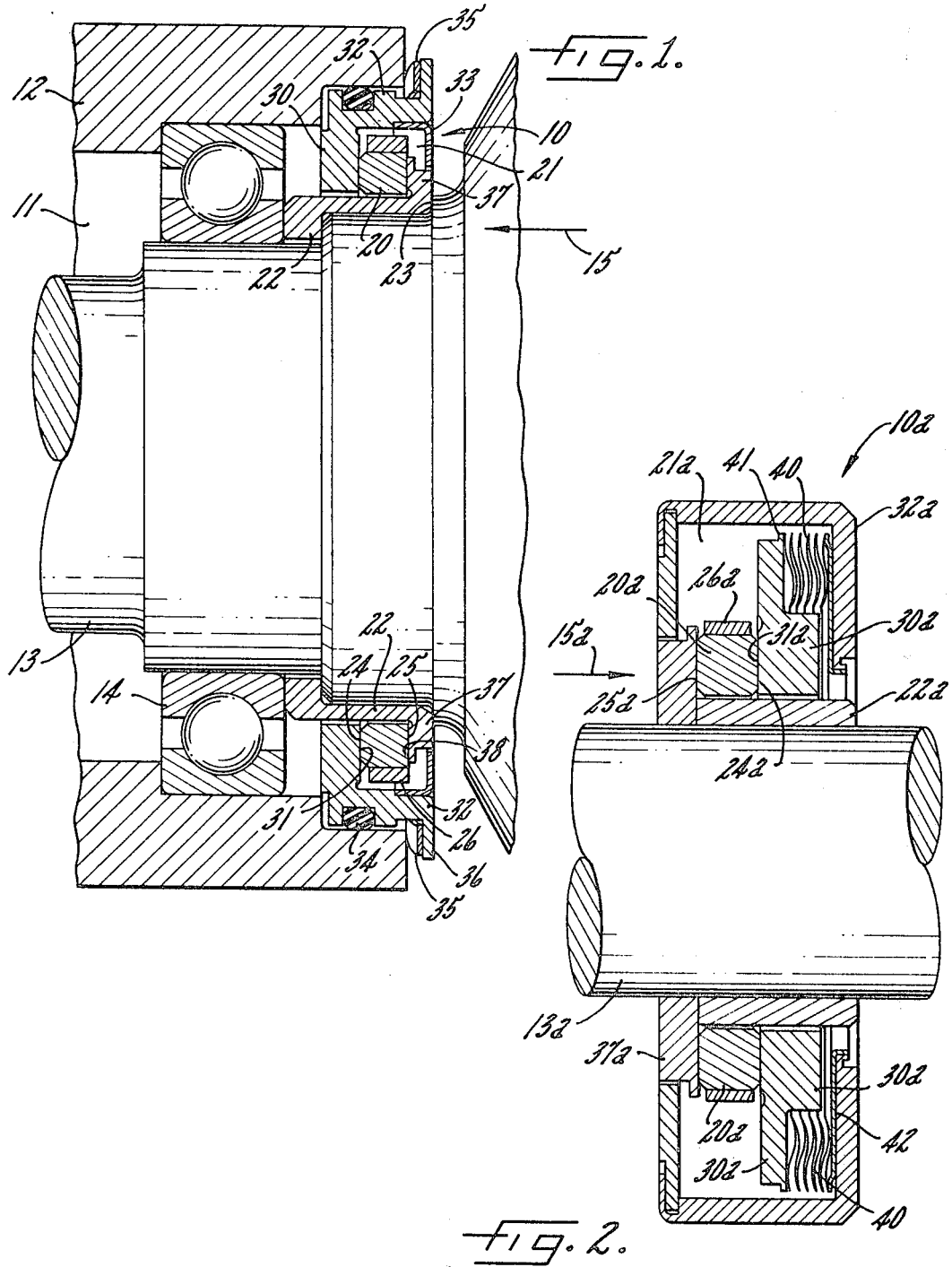
INVENTORS.
ROBERT M. VOITIK
KERMIT D. YOST
BY
*Wolfe, Hubbard, Voit & Osann*
ATTORNEYS.

United States Patent Office 3,443,815
Patented May 13, 1969

3,443,815
PRESSURE RELIEVED LABYRINTH
Robert M. Voitik, Glenview, and Kermit D. Yost, Skokie, Ill., assignors to Continental Illinois National Bank and Trust Company of Chicago, as trustee
Filed July 14, 1966, Ser. No. 565,201
Int. Cl. F16j 15/36, 15/34
U.S. Cl. 277—83      5 Claims

ABSTRACT OF THE DISCLOSURE

A rotary seal for providing an effective seal between a housing and a rotatable shaft under static and start-up conditions as well as extreme high temperature and pressure conditions incurred during high speed operations. The seal includes a stator wall and rotor which are biased into engagement during low pressure start-up conditions to prevent fluid leakage, but are axially movable in response to a predetermined pressure differential to permit the rotor limited axial movement so that it may operate at high speeds as a floating type seal without excessive wear of the rotor and stator.

---

This invention relates generally to rotary seals and more particularly to a floating labyrinth-type rotary seal that will effectively seal under static conditions, as well as at high speeds and extreme temperatures.

Labyrinth seals are utilized extensively in gas turbines because of their exceptional ability to operate at high speeds and extreme temperatures. Seals of this type depend in part for their effective operation upon the rate of rotation of the shaft being sealed. Under static conditions or during slow speed operation, these seals have proven less satisfactory due to the excessive leakage of hot gases through the seal before the parts reach normal operating temperatures.

It is an object of the present invention to provide an improved floating labyrinth rotary seal that not only provides a positive seal at extreme temperatures and speeds, but also provides an effective seal under static and start-off conditions.

It is also an object to provide a rotary seal of the above kind in which the rotor and stator elements of the seal are biased into sealing contact under low pressure start-up conditions, but when a predetermined pressure differential is reached across the seal as speed and temperature increase, the rotor is moved out of contact with the stator in response to the pressure differential permitting the seal to operate at high speeds without excessive wear between the rotor and stator.

Other objects and advantages of the invention will become apparent upon reading the following detailed description and upon reference to the drawings, in which:

FIG. 1 is a fragmentary section of a shaft assembly showing a seal embodying the present invention; and FIG. 2 is a fragmentary section of a shaft assembly showing a modified type of seal embodying the present invention.

While the invention will be described in connection with certain preferred embodiments, it will be understood that we do not intend to limit the invention to those embodiments. On the contrary, we intend to cover all alternatives, modifications and equivalents as may be included within the spirit and scope of the invention as defined by the appended claims.

Turning first to the embodiment of FIG. 1, there is shown a seal 10 embodying the invention positioned to seal an opening 11 between a housing 12 and a relatively rotatable shaft 13. A bearing 14 mounts the shaft 13 in the housing 12. The direction of fluid pressure is shown by the arrow 15.

The seal 10 is of the floating labyrinth type and includes an annular rotor 20 carried on the shaft 13 within an annular inwardly opening chamber 21 sealed to the housing 12. In the illustrated construction, the rotor 20 is closely fitted, but axially slidable, on a sleeve 22 that is mounted on the shaft 13 between a shoulder 23 and the bearing 14. Preferably, the rotor 20 is formed of carbon with flat side sealing surfaces 24 and 25, and a steel retaining band 26 is tightly fitted about the carbon.

In accordance with the invention, the chamber 21 is partially defined by an axially movable stator wall 30 having an annular flat sealing face 31 positioned to come into sealing engagement with the rotor surface 24, and the wall 30 is sealed and biased with respect to the housing 12 so that the face 31 presses against the surface 24 in the absence of a fluid pressure drop across the seal 10. In this FIG. 1 embodiment, the wall 30 is formed integrally with a casing body 32 that also carries a cap 33 so that a seal cartridge is defined surrounding the rotor 20. The wall 30 is sealed to the housing 12 by a resilient O-ring type of sealing member 34 acting between the casing body 32 and the housing 12. The wall is biased by an annular wave spring 35 acting between the housing 12 and a flange 36 on the casing body 32. Movement of the rotor 20 axially under urging from the spring 35 is blocked by a shoulder 37 formed integrally with the sleeve 22 and having a radial sealing surface 38 adapted to flatly abut the rotor surface 25.

Under static conditions, it will be seen that the spring biased wall 30 urges the rotor 20 against the shoulder 37 so that their respective sealing surfaces are in bearing relationship to resist fluid leakage in the direction of the arrow 15. In a typical seal application, such as a gas turbine, the fluid pressure and shaft r.p.m. speeds build up together. When pressure on the wall 30 and the rotor 20 exceeds the force exerted by the spring 35, both the wall 30 and the rotor 20 move away from the shoulder 37 of the sleeve 22, thus alleviating the clamping action upon the rotor. However, at this point, the shaft and rotor have reached a high r.p.m. and the seal continues to function effectively as a floating labyrinth of the conventional type.

It can therefore be seen that the seal 10 provides both effective static sealing during start-up conditions and also high-speed, high temperature sealing under the kinds of operating conditions encountered in gas turbines and like machinery.

In the FIG. 2 embodiment, similar parts have been given numbers corresponding to those previously described with the distinguishing suffix a added. FIG. 2 thus shows a seal 10a embodying the invention and associated with a shaft 13a. The fluid pressure acting on the seal 10a is exerted in the direction of the arrow 15a, and it will be understood that the seal 10a is intended to be fitted and sealed within a housing, not shown.

The seal 10a includes a rotor 20a having a surrounding band 26a and opposite flat sealing surfaces 24a and 25a. A chamber 21a surrounds the rotor 20a and is defined by a movable stator wall 30a having a flat sealing face 31a adapted to abut the rotor sealing surface 24a. The stator wall 30a and a casing body 32a together form a cartridge type seal surrounding and containing the rotor 20a.

The wall 30a is biased and sealed with respect to the housing by a metal bellows 40 that is sealed between a lip 41 on the wall 30a and a disk 42 which is locked in the casing body 32a. The metal bellows 40 has axial resilience and hence not only provides a fluid seal between the wall 30a and the surrounding casing body 32a, but also exerts a resilient force that urges the wall 30a against the adjacent rotor 20a. Axial movement of the rotor 20a is blocked by a shoulder 37a carried on the shaft 13a adjacent a sleeve 22a on which the rotor 20a slides.

The operation of the seal 10a is substantially identical to that of the seal 10. Under static conditions, the wall 30a and the rotor 20a combine to define a diaphragm which resiliently resists fluid pressure leakage in the direction of the arrow 15a. In a gas turbine application, an increase in fluid pressure in the direction of the arrow 15a acts against the wall 30a and, when a force is exerted that exceeds the resistance developed by the bellows 40, the wall 30a and rotor 20a move away from the shoulder 37a of the sleeve 22a and thus alleviates the clamping action of the bellows 40 upon the rotor 20a. As pointed out above, such an increase in fluid pressure is accompanied, in a typical gas turbine application, by an increase in shaft r.p.m. and hence when the stator 30a and rotor 20a move away from the shoulder the parts are operating at a high speed and the seal 10a functions as a conventional labyrinth type seal. Again, as in the case with the seal 10, good static sealing as well as effective high speed-high temperature is obtained.

We claim as our invention:

1. An assembly for providing a fluid seal between a housing and a relatively rotatable shaft passing through an opening in said housing under both static and high speed extreme temperature pressure conditions, comprising, in combination, an annular rotor closely and slidably fitted on said shaft, said rotor having a flat side sealing surface, means for blocking axial sliding movement of said rotor when force is exerted on said surface, an axially movable stator wall having an annular flat sealing face positioned to come into sealing engagement with said surface, means including said stator wall defining an annular inwardly opening chamber surrounding said rotor, means sealing and biasing said wall with respect to said housing so that said face presses against said surface in the absence of a fluid pressure drop across the seal, and said stator wall and rotor being axially movable in response to a predetermined pressure drop across said seal so that said shaft may be operated at high speeds and temperatures without excessive wear to said rotor and stator.

2. The combination of claim 1 in which said sealing and biasing means includes a bellows sealed between said wall and said chamber defining means.

3. The combination of claim 1 in which said chamber defining means includes an annular casing surrounding said wall and said rotor so as to define a cartridge seal assembly.

4. The combination of claim 1 in which said sealing and biasing means includes a resilient sealing member and a spring acting between said wall and said housing.

5. The combination of claim 1 in which said blocking means includes a shoulder on said shaft having a flat radial surface, and said rotor has a second radial sealing surface cooperating with said shoulder surface.

References Cited

UNITED STATES PATENTS

| 3,009,717 | 11/1961 | Laser | 277—93 X |
| 3,288,474 | 11/1966 | Gits | 277—83 X |

FOREIGN PATENTS

| 783,197 | 9/1957 | Great Britain. |

LAVERNE D. GEIGER, *Primary Examiner.*

JEFFREY S. MEDNICK, *Assistant Examiner.*

U.S. Cl. X.R.

277—88